United States Patent
Kitamura

(10) Patent No.: US 7,575,801 B2
(45) Date of Patent: Aug. 18, 2009

(54) PHOTOCATALYTIC COATING AND STEEL PLATE AND CANVAS COATED WITH THE SAME

(75) Inventor: Toru Kitamura, Osaka (JP)

(73) Assignee: Pialex Technologies Corp., Osaka (JP)

( * ) Notice: Subject to any disclaimer, the term of this patent is extended or adjusted under 35 U.S.C. 154(b) by 252 days.

(21) Appl. No.: 11/600,633

(22) Filed: Nov. 16, 2006

(65) Prior Publication Data

US 2008/0118744 A1    May 22, 2008

(51) Int. Cl.
- *B32B 5/02* (2006.01)
- *B32B 15/08* (2006.01)
- *B32B 15/18* (2006.01)
- *B32B 27/04* (2006.01)
- *B32B 27/12* (2006.01)
- *B32B 27/18* (2006.01)

(52) U.S. Cl. ...................... 428/339; 428/422; 428/457; 442/108; 442/118; 442/152

(58) Field of Classification Search ........................ None
See application file for complete search history.

(56) References Cited

U.S. PATENT DOCUMENTS 6,337,129 B1 * 1/2002 Watanabe et al. ........... 428/328

FOREIGN PATENT DOCUMENTS

| JP | 11343426 | 12/1999 |
|----|----------|---------|
| JP | 2000073297 | 3/2000 |

OTHER PUBLICATIONS

Fan et al., Integrated Chemical Systems: Photocatalysis at TiO2 Incorporated into Nafion and Clay, J. Phys. Chem., 89, pp. 4418-4420 (1985).*

* cited by examiner

*Primary Examiner*—Ramsey Zacharia
(74) *Attorney, Agent, or Firm*—Marshall, Gerstein & Borun LLP

(57) ABSTRACT

The present invention provides a photocatalytic coating which has a predetermined photocatalytic function and reduces hardening time after coating, and the hardened coated film is not dissolved due to photocatalytic function and has flexibility. The present invention also provides a photocatalytic coating in which NAFION® (registered trademark of DuPont) is used as an organic resin binder which is not dissolved due to a photocatalytic reaction and has flexibility after dry hardening, and provides steel plates and canvases are coated with said photocatalytic coating, wherein the coatings are not removed when the coated film is bent after coating.

12 Claims, No Drawings

PHOTOCATALYTIC COATING AND STEEL PLATE AND CANVAS COATED WITH THE SAME

FIELD OF THE INVENTION

The present invention relates to a composition comprising a photocatalytic coating mixed with a metal oxide having photocatalytic function, and steel plate and canvas coated with the composition.

BACKGROUND OF THE INVENTION

Recently, catalytic coating mixed with a metal oxidant having excellent photocatalytic function in contamination resistance and antibacterial property have drawn attention.

Coatings used for exterior walls of buildings, vehicle steel plate, canvas and others, is desired to have an excellent appearance, and less adhesive characteristic against dirt, including rain marks, i.e. contamination resistance (environmental contamination).

For this reason, there is sought a method for effectively utilizing coating material and surface finishing material (hereinafter, referred to as together as "coating" or "coatings") which have excellent hydrophilic properties and provides contamination resistance and antibacterial properties. When a metal oxide having photocatalytic function is mixed as a coating, a hydrophilic resin binder (hydrophilic polymer) is generally used to fully enhance the photocatalytic function against environment contamination.

Further, since the photocatalytic function excites an extreme redox reaction to dissolve organics, it also dissolves an organic resin binder mixed as a coating, thereby causing a problem of deterioration and poor durability of the coating film.

Therefore, a glassy inorganic binder called a silica sol is usually used, when the photocatalytic coating is mixed.

A patent application already has been filed for a photocatalytic coating which includes a silica sol and is excellent in dispersion stability (for example, Japanese Patent JP-A-H11-343426 (Pages 1 to 5)).

Further, a patent application has been filed for a titanium oxide coating composition using a silica sol as a binding material which is not deteriorated as a result of a photocatalytic reaction (for example, Japanese Patent JP-A-2000-73297).

SUMMARY OF THE INVENTION

The coating mixed with an oxide having a photocatalytic function, and including a silica sol as a binder, and prevented from deterioration has a problem of requiring a long time for hardening.

Further, the coating film has insufficient flexibility after hardening and it is not suitable for steel plate that is subjected to a bending process performed after coating. It is also not suitable for canvas subjected to repeated assembling and folding.

To solve the above-mentioned problems, object of the present invention are to provide a photocatalytic coating having a predetermined photocatalytic function, shortening the hardening time after coating, having a coating film that is not dissolved by a photocatalytic reaction, and having flexibility, and further to provide a film-coated substrate, particularly steel plate and/or canvas wherein the film coating is not removed when being bent after applying the photocatalytic coating.

The present invention according to claim 1 solves the above-mentioned objects and is a photocatalytic coating wherein a metal oxide having a photocatalytic function is mixed with an organic resin binder which has a molecular chain of high binding energy so as not to be dissolved due to a photocatalytic reaction and which has small intermolecular coagulation power and has flexibility after dry hardening.

With the above configuration, since the resin binder is not dissolved, the coated film is not deteriorated and has a long life and can perform a photocatalytic function for a long period of time. And since it has flexibility after dry hardening, the coated film is not cracked or removed even though being bent.

The invention according to claim 2 is a photocatalytic coating wherein said organic binder is polytetrafluoroethylene graft polymer having a sulfonate group.

With the configuration related to claim 2, since that organic binder is not dissolved due to photocatalytic reaction and performs an ultra hydrophilic property after dry hardening, the photocatalytic coating is extremely effective against environmental contamination.

The invention according to claim 3 is a photocatalytic coating wherein said metal oxide is porous titanium oxide.

With the configuration related to claim 3, since the titanium oxide is porous, the coated film fully performs not only the contamination resistance function but also provides a deodorant function.

The invention according to claim 4 is a steel plate wherein the photocatalytic coating according to claim 1 has a thickness of not less than 1 µm.

With the configuration related to claim 4, since the hardened coated film has flexibility, the steel plate can be subjected to bending processes after coating. And since the thickness of the coated film is not less than 1 µm, the coated film fully performs both a contamination-resistance function and a deodorant function.

The invention according to claim 5 is a canvas wherein the photocatalytic coating according to claim 1 has a thickness of not less than 1 µm.

With this configuration related to claim 5, the photocatalytic coating can be used for canvas which is subjected to repeated folding and assembling to form the canvas coated with the film that performs predetermined photocatalytic function.

The invention according to claim 6 is a photocatalytic coating wherein said organic binder is the binder of formula (1);

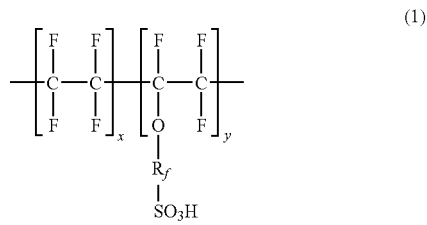

That organic binder is NAFION® (a registered trademark of DuPont) which is polytetrafluoroethylene graft polymerized and having a sulfonate group.

With the configuration related to claim 6, since NAFION® is not dissolved due to photocatalytic reaction and performs an ultra hydrophilic property after dry hardening, the photocatalytic coating is extremely effective against environmental contamination.

With the present invention, as mentioned above, the photocatalytic coating is not deteriorated due to the photocatalytic reaction, and provides a coating film which is flexible and has an ultra hydrophilic property after having been subjected to dry hardening, and is extremely effective against environmental contamination. Further, the steel plate has a coating film which is not removed when the steel plate coated with the photocatalytic coating is bent and can be subject to bending processes after coating, and canvas which can be subject to repeated assembling and folding.

DETAILED DESCRIPTION OF PREFERRED EMBODIMENTS

Embodiments of a photocatalytic coating related to the present invention will be described in detail hereinafter.

A photocatalytic coating of the present invention is a coating mixed with a NAFION® photocatalytic metal oxide, which is polytetrafluoroethylene graft polymerized having a sulfonate group, as a resin binder.

The above mentioned NAFION® is an organic polymer which is generally used as a solid electrolyte in a solid type polymeric fuel cell and an organic resin which is highly stable against an electrochemical reaction.

The present inventor confirmed that it was also extremely stable against a photocatalytic reaction.

As for the metal oxide having photocatalytic function, examples include titanium oxide, zinc oxide, tin oxide, and the like. However, titanium oxide whose photocatalytic function is particularly stable and which is easily available is preferably employed. Said titanium oxide is commercially sold in a minute particulate state. This is mixed and agitated in organic solvent, and water with the appropriate resin binder to manufacture the photocatalytic coatings as described herein.

Further, the resin binder used to disperse the photocatalytic metal oxide having a photocatalytic property, such as titanium oxide, is a hydrophilic resin binder in order to enhance the photocatalytic reaction and to purify the coating surface by utilizing the ultra hydrophilic property.

However, when the hydrophilic resin binder is mixed with the photocatalytic metal oxide, binder dissolution (self dissolution or a kind of decomposition of the binder) occurs by a caustic redox reaction by photocatalysis, thereby causing problem of poor durability.

For this reason, a glassy inorganic binder called a silica sol is used at present. Since this silica sol expresses substantially same characteristic, it is stable against the photocatalytic reaction, but there are two fatal defects i.e. no flexibility and requiring a long time for completion of the hardening(curing) reaction.

Because of no flexibility, the coated film is cracked and removed when the film-coated substrate is bent, and because the hardening reaction requires a long time to cure, it is not suitable for high speed continuous production, such as color steel plates and other film-coated substrates.

The present inventor produced compositions mixed with titanium oxide, a photocatalytic metal oxide, by a binder, NAFION® which is an organic polymer generally used as a solid electrolyte of solid polymer type fuel cells. He realized that the binder of this composition performed a hydrophilic property while it prevented the composition from deterioration as a result of the photocatalytic reaction.

It was also realized that a coating produced by mixing the above mentioned composition with solvent (e.g. ethanol) required an extremely short time for drying and curing after coating.

Therefore, the photocatalytic coating obtained by mixing NAFION®, titanium oxide, and appropriate solvent such as ethanol, water and the like at in a predetermined amount, and agitating and blending them, provides a conventional photocatalytic function and ultra hydrophilic property while it requires a short time for drying and curing without deteriorating the resin binder.

Further, it has also been found that the photocatalytic coating using the NAFION® as a binder provides a coated film, after coating, that is extremely flexible.

Therefore, said coating is suitable for high speed continuous production of coated products, and also suitable for color steel plates subjected to bending processes after coating. Further, the photocatalytic coating is found excellent for coating canvas that is subjected to repeated folding and assembling.

Further, because the binder is prevented from self dissolution, the binder is not deteriorated even though mixed with an increased amount of the photocatalytic metal oxide. Therefore, it is possible to increase the concentration of the metal oxide as high as possible in the coating.

If the coatings described herein contain the photocatalytic metal oxide, it has an ultra hydrophilic property and is less subject to environmental contamination. And the coatings also can perform other photocatalytic functions such as a deodorant function and an antibacterial function.

The coating itself should have a sufficient gas absorption ability to fully perform the above-mentioned deodorant function and antibacterial function. To meet this requirement, the absorption surface area of the coating film may be enlarged. Metal oxides, such as titanium oxide, having a large specific surface area preferably are employed. An example is porous titanium oxide ST-01 manufactured by Ishihara Sangyo.

Further, it also enable the absorption function to be supported not only by the surface but also by inside of the coated film in the thickness direction by making the coated film not less than the predetermined thickness (e.g. not less than 1 µm). Therefore, the deodorant function can be fully performed by preventing or lessening gas and liquid absorption inside the coated film.

Next, embodiments of the photocatalytic coatings described herein will be described in detail.

Embodiment A: Photocatalytic coating of the present invention wherein titanium oxide ST-01 (manufactured by Ishihara Sangyo: having a specific surface area of 300 m$^2$/g) 100 parts by weight, NAFION® DE2021 (20% solution, manufactured by DuPont) 50 parts by weight, and ethanol 40 parts by weight were mixed for preparation.

Comparative example B: Photocatalytic coating containing Snow Tex 20 (manufactured by Nissan Kagaku) as the, hydrophilic polymer, instead of NAFION® DE2021, and water instead of ethanol.

Using the compositions of said embodiment A and comparative example B, and using a PET film as a substrate, the PET surfaces were coated with the photocatalytic coatings at 50 g/m2 respectively, and the time up to hardening was recorded as well as the presence or absence of a photocatalytic effect, and the condition of the coated films when being bent were examined. The result are shown in Table 1. Additionally, the photocatalytic effect was verified by a contamination resistance effect and a deodorant effect.

With regard to the contamination resistance effect, the contamination condition of the portion subjected to photocatalysis, and the portion not subjected, was inspected by visual check after 2 months of outdoor natural exposure. With regard to deodorant experiment, an ammonia concentration change was measured after 3 hours of irradiation from a distance of 50 cm with 20 W fluorescent lamp.

TABLE 1

| | Embodiment A | Comparative Example B |
|---|---|---|
| Photocatalytic Effect | Presence | Presence |
| Adhesiveness with PET | Good | Removal Occurrence |
| Dry Hardening Time | 1 minute | 40 minutes |

Obviously, as shown in Table 1, it was found that Embodiment A of the present invention had a photocatalytic effect (contamination resistance effect and deodorant effect), maintained good adhesiveness without removal after bending, and dry hardening time was short, only 1 minute. Further, the photocatalytic coating (Comparative Example B) using a prior art hydrophilic polymer as a binder had a photocatalytic effect, but removal occurred with bending after dry hardening. Further, the dry hardening time after coating was long, 40 minutes.

That means, it was found that the photocatalytic coating mixed with titanium oxide as the metal oxide, and NAFION® as a binder had the predetermined photocatalytic effect as well as a contamination resistance function, and a deodorant function. Additionally, the time required for dry hardening after coating was extremely short, the coated film had flexibility, and the coated film was not removed when the coated substrate was bent.

That is considered because the binding energy of C—F combination constituting the fluoropolymer is high and forms extremely precise and stable molecular chains, thereby the crystallinity degree is high, chemical (environmental contamination) resistance and climatic resistance is provided, and it is highly stable against electrochemical reaction. Further, it is considered that due to the small atomic radius and low polarization of the F atom, intermolecular coagulation power becomes low, characteristics of low surface tension and low friction coefficient are provided, thereby it is easy to be deformed. (Ref. to P.306 Plastic, Functional Polymer Material Dictionary: published by Sangychousakai Dictionary Publication Center, 2004).

As mentioned above, the photocatalytic coatings of the present invention, include a metal oxide having a photocatalytic function (e.g. titanium oxide) mixed with an organic binder having flexibility after dry hardening, the binder is not dissolved by the photocatalytic reaction.

Therefore, materials having the above-mentioned characteristics (there is no deterioration due to a photocatalytic reaction, and the coating has flexibility) may be used as a binder. However a general resin binder does not contain C—H combination, because the C—H combination of carbon and hydrogen is dissolved by the photocalytic reaction. Therefore the above mentioned NAFION® which has multiple C—F combination having a high binding power is provides the above-mentioned advantages.

A chemical formula of said NAFION® is shown below.

[Formula 1]

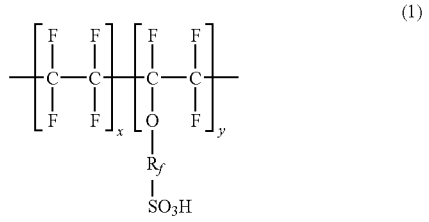

(1)

As shown in the above chemical formula, NAFION® is a graft polymer (graft polymerized polytetrafluoroethylene) comprising repeat unit of polymerized polytetrafluoroethylene having a sulfonic acid (for example; perfluorosulfonic acid: $R_f$—$SO_3H$) as a side chain, and it has no C—H groups in the polymer combination but primarily C—F groups which are highly stable against electrochemical reactions, thereby, the structure is less subject to being dissolved by photocatalytic reactions.

The molecular weight of NAFION® is uncertain, although the molecular weight has been estimated at $10^5$-$10^6$ Da.

As mentioned above, since the photocatalytic coating (Embodiment A) of the present invention is mixed with titanium oxide having photocatalytic function by using the NAFION® organic resin binder without dissolution as a result of the photocatalytic reaction, and having flexibility after dry hardening, the coated film is not deteriorated after coating and therefore it can be long lasting to continuously perform the photocatalytic function. Further since it has flexibility after dry hardening, the coated film is not removed when it is bent after coating, therefore the photocatalytic coating is capable of maintaining a stable film coating.

Therefore, it is also suitable for surface processing materials for color steel plate which is subjected to a bending process after coating, and surface processing materials of canvas subjected to repeated folding and assembling.

Further, with porous titanium oxide and the coating film having a thickness not less than a predetermined thickness (not less than 1 µm based on the deodorant experiment), the gas absorption ability can be increased and the photocatalytic activity, deodorant function, and antibacterial function against outside air are improved.

Furthermore, the coating may be applied to other substrates, particularly for color steel plates and canvas; to provide contamination resistant coatings for exterior walls, gates, and locker, and it is also adaptable for a contamination resistant and deodorant coatings for vehicle bodies and glass surfaces.

The compositions and coatings described herein may be used as surface films on any substrate, particularly for deodorant effects and contamination resistance for accessories such as sofas, and chairs and fabric and leather seating surfaces inside vehicles.

As mentioned above, the present invention provides a photocatalytic coating in which deterioration due to photocatalytic reaction is prevented, the coated film holds flexibility after dry hardening, thereby the coating has extremely efficient contamination resistance against environmental contamination and is extremely durable. Further because of the short dry hardening time, it is also adaptable for color steel plate production line of continuous production and high-speed printing.

Further, the photocatalytic coating which is adaptable for thin film steel plate subjected to a bending process after coating, and adaptable for canvas subjected to repeated folding and assembling.

Therefore, steel plates and canvases having contamination functions and deodorant functions, coated with the long life films described herein, and capable of being bent are obtained.

What is claimed:

1. A steel plate coated with a photocatalytic coating comprising
   a metal oxide having photocatalytic function in a mixture with an organic resin binder which has (i) a molecular chain of sufficient binding energy so as not to be dissolved due to photocatalytic reaction, (ii) small intermolecular coagulation power, (iii) flexibility after dry hardening, and (iv) is hydrophilic, wherein a surface of the photoactalytic coating comprises one of (i) the organic resin binder and (ii) the organic resin binder and the metal oxide, and, wherein the photocatalytic coating has a thickness of not less than 1 μm.

2. The photocatalytic coating according to claim 1 wherein said organic binder is polytetrafluoroethylene graft polymer having a sulfonate group.

3. A photocatalytic coating according to claim 2 wherein said metal oxide is porous titanium oxide.

4. The photocatalytic coating according to claim 2, wherein the organic binder is the binder of formula (1);

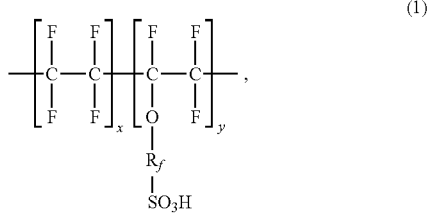

(1)

wherein $R_f$ is a perfluoromethylene group.

5. The photocatalytic coating according to claim 4, wherein the perfluoromethylene group is $(CF_2)_n$, wherein n=1-20.

6. The photocatalytic coating according to claim 5, wherein n=2.

7. A canvas coated with the photocatalytic coating comprising a metal oxide having photocatalytic function in a mixture with an organic resin binder which has (i) a molecular chain of sufficient binding energy so as not to be dissolved due to photocatalytic reaction, (ii) small intermolecular coagulation power, (iii) flexibility after dry hardening, and (iv) is hydrophilic, wherein a surface of the photoactalytic coating comprises one of (i) the organic resin binder and (ii) the organic resin binder and the metal oxide, and wherein the photocatalytic coating has a thickness of not less than 1 μm.

8. A photocatalytic coating according to claim 7 wherein said organic binder is polytetrafluoroethylene graft polymer having a sulfonate group.

9. A photocatalytic coating according to claim 8 wherein said metal oxide is porous titanium oxide.

10. A photocatalytic coating according to claim 8, wherein the organic binder is the binder of formula (1);

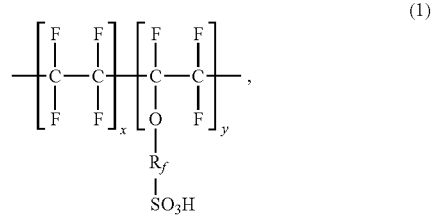

(1)

wherein $R_f$ is a perfluoromethylene group.

11. The photocatalytic coating according to claim 10, wherein the perfluoromethylene group is $(CF_2)_n$, wherein n=1-20.

12. The photocatalytic coating according to claim 11, wherein n=2.

* * * * *